(12) United States Patent
Robinson, Jr.

(10) Patent No.: US 7,944,807 B2
(45) Date of Patent: May 17, 2011

(54) SYSTEM AND METHOD FOR IMPLEMENTING A SINGLE-WIRE SERIAL PROTOCOL

(75) Inventor: Curtis B. Robinson, Jr., Sunnyvale, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 723 days.

(21) Appl. No.: 11/874,145

(22) Filed: Oct. 17, 2007

(65) Prior Publication Data

US 2008/0123730 A1 May 29, 2008

Related U.S. Application Data

(60) Provisional application No. 60/829,829, filed on Oct. 17, 2006.

(51) Int. Cl.
*H04J 9/00* (2006.01)
*H04J 7/00* (2006.01)

(52) U.S. Cl. ........................................ 370/204; 370/212

(58) Field of Classification Search .................. 370/204, 370/205, 212, 213
See application file for complete search history.

(56) References Cited

U.S. PATENT DOCUMENTS

| | | | | |
|---|---|---|---|---|
| 4,723,237 | A * | 2/1988 | Andrew et al. | 370/204 |
| 4,829,296 | A * | 5/1989 | Clark et al. | 340/5.65 |
| 4,941,126 | A * | 7/1990 | Haubursin | 327/108 |
| 5,007,042 | A * | 4/1991 | Santi | 370/212 |
| 5,052,037 | A * | 9/1991 | Perelman | 348/14.12 |
| 5,159,584 | A * | 10/1992 | Yanagida et al. | 369/13.17 |
| 5,313,085 | A * | 5/1994 | Hasegawa | 257/370 |
| 5,430,707 | A * | 7/1995 | Zwack et al. | 370/212 |
| 5,537,515 | A * | 7/1996 | Yokoyama et al. | 358/1.9 |
| 5,796,968 | A * | 8/1998 | Takamiya | 710/113 |
| 6,457,178 | B1 * | 9/2002 | Slim | 725/127 |
| 6,593,919 | B1 * | 7/2003 | Kishita et al. | 345/204 |
| 2007/0162764 | A1 * | 7/2007 | Hass et al. | 713/187 |

* cited by examiner

*Primary Examiner* — Hong Cho
(74) *Attorney, Agent, or Firm* — Perkins Coie LLP

(57) ABSTRACT

Methods and apparatus for a single-wire serial communication system are disclosed herein. In one embodiment, a method includes defining a predetermined short pulse as data to be transmitted and a predetermined long pulse as a data separator for the data to provide serial communication for a data stream.

21 Claims, 15 Drawing Sheets

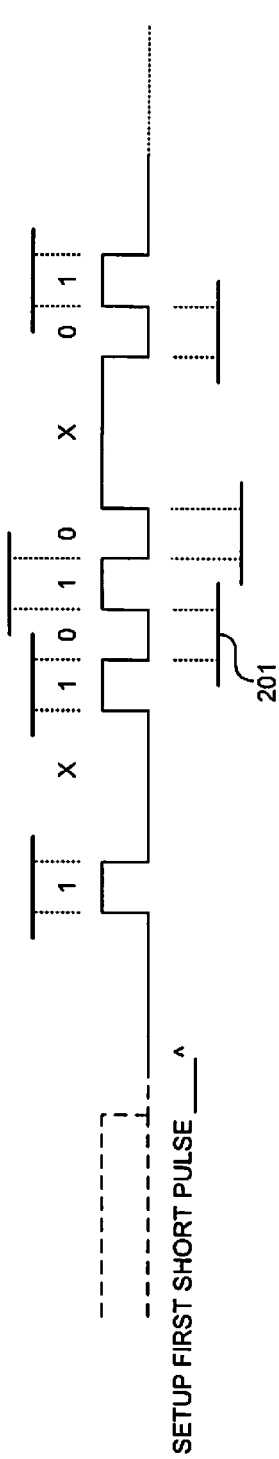
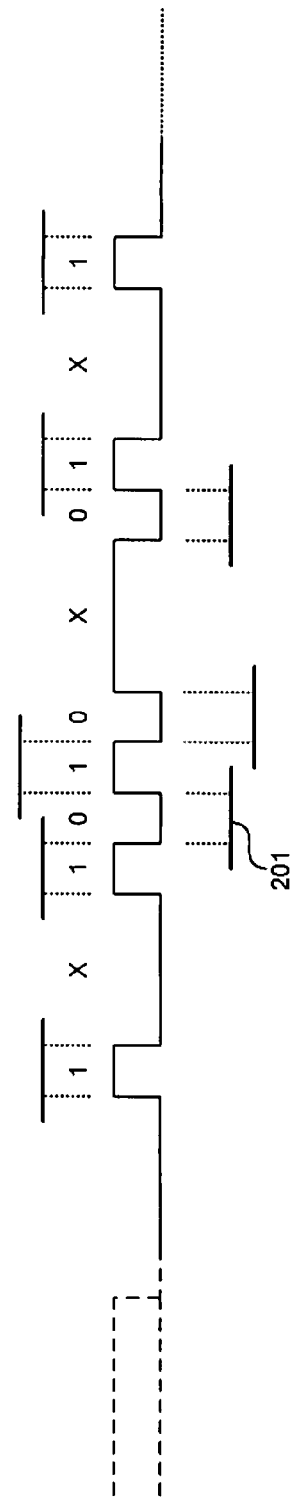
FIG. 2A
FIG. 2B

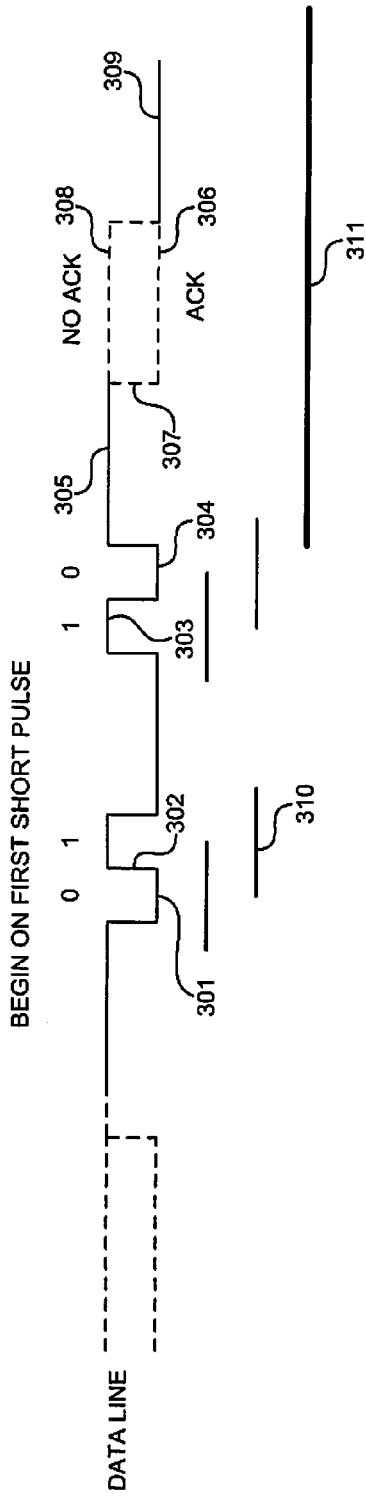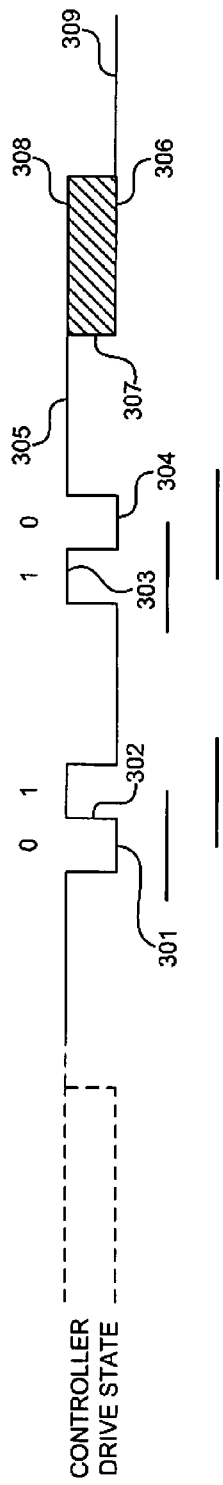
FIG. 3A
FIG. 3B

SYSTEM AND METHOD FOR IMPLEMENTING A SINGLE-WIRE SERIAL PROTOCOL

CROSS-REFERENCE TO RELATED APPLICATION

This application claims the benefit of the filing date of U.S. provisional application Ser. No. 60/829,829, filed on Oct. 17, 2006, and incorporated herein by reference.

TECHNICAL FIELD

The present invention relates generally to the field of communication system, and more specifically, to electronic serial communication system.

BACKGROUND

Circuits for modern electronics are increasingly required to provide higher levels of functionality and circuits with communication ports are often used to set critical parameters. Despite the high levels of functionality required, many legacy applications use only one or two pins for control. As an example, a single pin interface is often used as a signal line in tight cell phone hinge areas where space is at a premium. New generations of parts in those legacy applications must still use one or two pins for the interface.

In a single-wire serial protocol, the pattern must convey both the polarity of the data as well as the data clock. To accomplish this, some known single-wire serial communication protocols use pulse counting. In these protocols, a pattern of pulses separated by a pause is received and the receiver counts the pulses after the pause. The count becomes the value for that packet of pulses. Repeating the pattern sends several values to the receiver for processing commands. Counting pulses however is an inherently inefficient technique. Some other protocols include pulse width modulation to differentiate high and low bits by high and low duty cycle. In a circuit requiring resolution of duty cycle, both measurement of the period as well as the pulse width are necessary to determine the difference between a high or a low. These methods require an entire period for duty cycle estimation and have inherent inefficiencies.

Typical prior art single-wire interface protocols require relatively large amounts of complex circuitry to implement. An elegant single-wire serial protocol capable of efficient implementation is described below.

SUMMARY

The invention is described and illustrated in conjunction with systems, apparatuses and methods. In addition to the aspects of the present invention described in this summary, further aspects of the invention will become apparent by reference to the drawings and by reading the detailed description that follows.

A method and apparatus for a single-wire serial communication includes defining a predetermined short pulse as data and a predetermined long pulse as a data separator.

BRIEF DESCRIPTION OF THE DRAWINGS

The invention is illustrated in examples by the accompanying drawings. The drawings should be understood as examples, rather than limiting.

FIGS. 2A and 2B illustrate example protocol sequences without a terminator.

FIGS. 3A and 3B illustrate example protocol sequences with data acknowledgement.

DETAILED DESCRIPTION

A method and apparatus are provided for a single-wire serial protocol. The specific embodiments described in this document represent example instances of the present invention, and are illustrative in nature rather than restrictive. In the following description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" means that a particular feature, structure, or characteristic described in connection with the embodiment is included in at least one embodiment of the invention. The appearances of the phrase "in one embodiment" or "in some embodiments" in various places in the specification are not necessarily all referring to the same embodiment, nor are separate or alternative embodiments mutually exclusive of other embodiments.

As will be apparent, the protocol described herein can be used for communication between a controller and a receiver. The controller can be any device that transmits data and the receiver can be any device that receives data. The protocol can also be used with controllers that are capable of receiving data and receivers that are capable of transmitting data. As used herein, data is used to refer to any information including, but not limited to, instructions, commands, opcodes, addresses and any other information of any kind represented in a binary form.

Fundamentals

The protocol provides that pulses shorter than a predetermined width are considered to be data pulses while pulses longer than the predetermined width are ignored. Thus, a data pulse having a width within the predefined pulse width signifies a valid bit value and a data pulse wider than the predefined pulse width signifies an ignored bit value. The high or low polarity of a short pulse accepted as data determines the high or low bit value, respectively. A long pulse can be a pulse long enough to be rejected as data, regardless of being high or low.

Some embodiments can additionally support using two long pulses at the end as a terminator. A sequence of two consecutive ignored bit values can be used as a communication terminator since there is no need to have two long pulses within the data transmission protocol.

Figure 1:
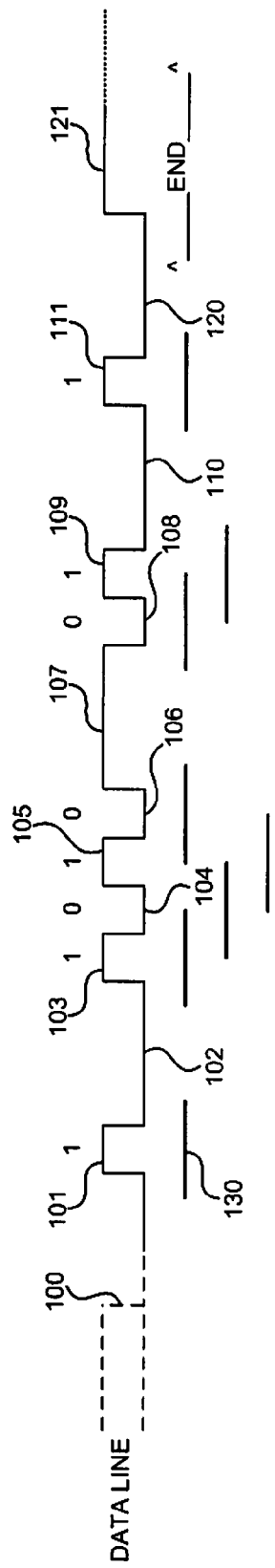
FIG. 1 illustrates an example protocol sequence.

FIG. 1 illustrates a basic data pattern for the protocol. FIG. 1 illustrates a send pattern including <11010011> using a maximum pulse width communication scheme. A transition at the beginning 100 may be used to set up the logical polarity for the first data pulse. As discussed above, a receiver can be configured to ignore transitions that have preceding widths longer than the acceptance width. In the example illustrated in FIG. 1, the first short pulse 101 is a high pulse. The short high pulse clocks in a high in the receiver's shift register. To avoid clocking in a low after the high, the following low pulse 102 is long. The example sequence follows with a high 103, a low 104, a high 105 and a low 106 clocking in successively. Each of pulses 103-106 is short enough to occur within the predetermined acceptance width. A maximum pulse width for data acceptance 130 can be specified. Successive highs or successive lows can be clocked in with only one long pulse between short pulses. In the example illustrated in FIG. 1, a long low pulse 102 is used between high pulses 101 and 103. Similarly, long high pulse 107 is used between low pulses 106 and 108. Thus, pulses having width within the predetermined acceptance width are recognized as indicative of a data value such as a logical high or low value for a bit.

Electrical embodiments of controllers and receivers for implementing the protocol may require a minimum pulse width due to the physical limitations of silicon circuitry or due to noise rejection requirements. In some embodiments, the single-wire interface protocol can be implemented with a minimum pulse width of 0.1 microseconds, for example. That is, a high or low pulse that maintains its value as a high or low pulse for less than 0.1 microseconds may not be considered to be a data pulse. Other minimum pulse widths could be defined for the protocol based on physical or logical considerations.

The protocol can define a short pulse as having a pulse width longer than the minimum pulse width and shorter than any arbitrarily chosen acceptance value. In some embodiments, a pulse shorter than 5 microseconds but longer than 0.1 microseconds can be considered to be a short pulse. A pulse longer than 5 microseconds can be considered to be a long pulse. In some embodiments, guard bands between short and long pulses, other minimum and maximum time periods can be used.

Figure 4:
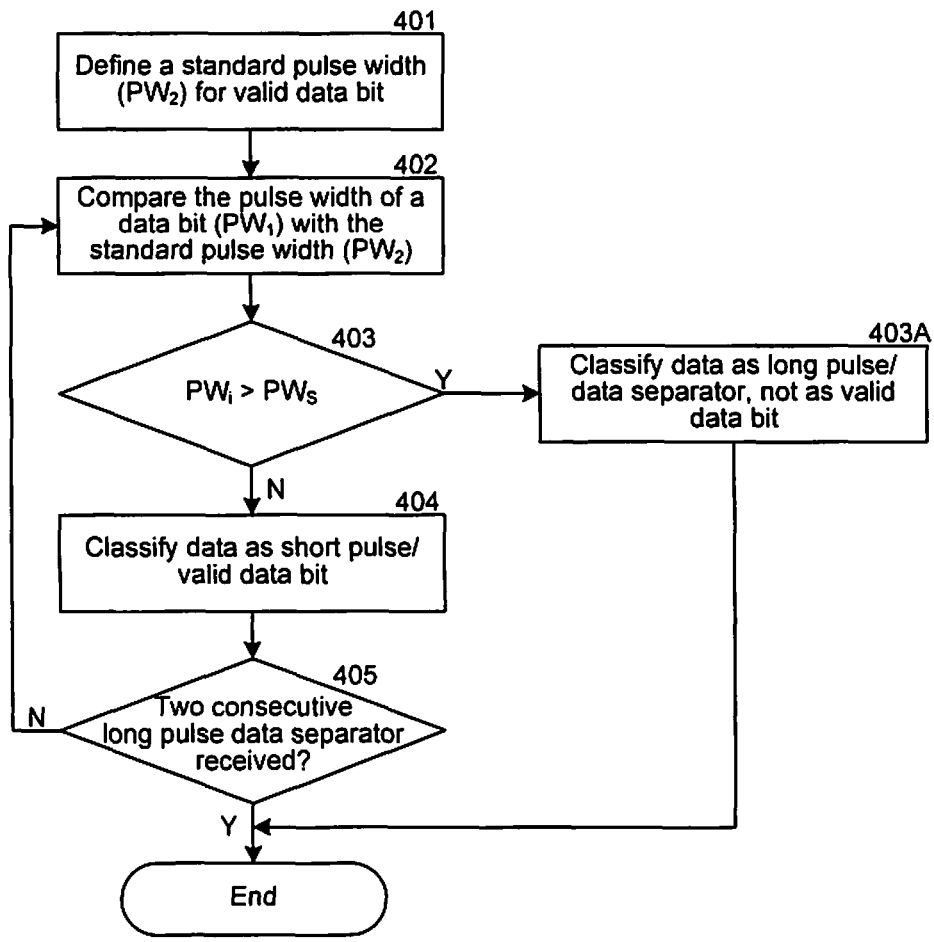
FIG. 4 illustrates an example method for classifying data.

FIG. 4 illustrates a method for classifying data using the protocol described above. In step 401, a standard pulse width (PWs) is defined for a valid data bit. In step 402, the received data bit pulse width (PWi) is compared with the standard pulse width (PWs). If the received data bit pulse width (PWi) is greater than the standard pulse width (PWs) in step 403, the data is classified as a long pulse or data separator and is not considered to be a valid data bit (403A).

In step 404, if the received data bit pulse width (PWi) is not greater than the standard pulse width (PWs), the data bit is classified as a short pulse or valid data bit. If a data separator is detected (such as two consecutive long pulses) in step 405, the valid data can be clocked in. If a data separator is not detected in step 405, step 402 is performed in which the received data bit pulse width (PWi) is compared with the standard pulse width (PWs).

Termination

As described above, the protocol can be used with only one intervening long pulse between successive highs or lows. As a result, the protocol allows two successive long pulses of opposite logical polarity in sequence to terminate the protocol and indicate that data is to be latched. FIG. 1 illustrates long low pulse 120 followed by a long high pulse 121. Because the preceding valid bit 111 was high, the termination began with a transition to a long low pulse. This example sequence of transitions can be used to indicate a termination. While not illustrated, the termination sequence could also be initiated by a long high pulse followed by a long low pulse if the preceding valid bit was low.

Termination can be optional and, in some embodiments, it is not used. For example, if there is no need to latch the data from the shift register, termination may not be necessary such as in the case for a single controller and receiver pair. In those embodiments, receivers that do not use the terminator can ignore it because it comprises only long pulses.

FIGS. 2A and 2B illustrate examples in which a termination such as the one formed by pulses 120 and 121 in FIG. 1 is not used. FIG. 2A illustrates the same data sequence of FIG. 1, <1101001>, without data value 111. FIG. 2B illustrates the same data sequence of FIG. 1, <11010011>. Data acceptance width 201 is indicated in both examples.

In some embodiments, a long pulse used by a controller can be as long as or longer than all pulses provided by a receiver. If the receiver is silent, the long pulse can be arbitrarily long.

Protocol Implementation with Different Types of Controllers and Receivers

The protocol described herein can be used with a single controller or with multiple controllers on the same wire. The protocol can also be used with any combination of one or more silent receivers, data acknowledging receivers, or data readback receivers. Additionally, various methods can be used to implement the protocol between and among the previously listed devices.

Multiple embodiments of controller-receiver combinations for the serial interface are possible. For example, a device may be interchangeable or exclusively a receiver or a controller that uses any combination of output drive strengths, data latching or double long pulse terminator recognition or acknowledgement. A silent receiver does not require drive capability. An unaddressed receiver does not need a latch or the recognition of the double long pulse terminator and will accept the data as it arrives. An addressed silent receiver can use an address encoded in the protocol to select which communication packet to accept as data. The latching can occur at the double long pulse termination sequence. A responding receiver can have the ability to use intermediate drive to perform data acknowledgement or to use timing for short pulses to make intermediate drive changes during readback. It can also be able to sense in current or voltage if its intermediate drive changes were successful.

A single controller that does not support data acknowledgement or data readback can be implemented using only strong output drive. It can address data to multiple receivers and ignore return information without sharing its line with another controller. A controller supporting data acknowledgement or data readback can communicate with multiple controllers and receivers. The examples provided below are illustrative of some of embodiments of this protocol and are not limiting.

For example, bidirectional communications can be allowed by using different levels of output drive capability in the controller and the receiver. The drive outputs in descending order of strength can be controller strong drive, receiver intermediate drive, controller weak drive and disabled drive or high impedance for any controller-receiver pair. In this implementation, the receiver can interject its line polarity changes at the appropriate points when the controller reverts to a weak drive. A standard off-the-shelf controller can perform this method by using distinctly valued resistors on multiple configurable pins instead using a variable drive output to create multiple drive strings.

Another example is the exclusive use of strong drive on the controller with the weaker drive on the receiver. This implementation requires that the controller have a current sensor and limiter to work with both receivers and controllers. In this case the controller will make all the transitions in the signal line but will detect whether there is a receiver fighting the line polarity in a weaker drive state at an appropriate point determined by the receiver's internal short pulse timer. Alternately, the timing of the pulse may be exclusively maintained by the controller through the use of its drive control. The current sensor in the controller will sense the current coming from the receiver and will decide whether to change polarity depending on its stage in the protocol. The result is the controller will make the necessary signal changes appear in the signal line in response to sensing current from the receiver weaker drive efforts. The controller will also sense current during its idle phase from another controller. This current derived from an opposing or alternating long pulse pattern can be a request for line control from a waiting controller in some embodiments.

In some embodiments, controller arbitration and handoff is performed with the use of time delays proportional to assigned addresses in the requesting controllers. Longer delays can be used to signify a higher priority assuming the delays are shorter than the predetermined period of inactivity and longer than the pulse acceptance width so as to prevent a new controller from becoming involved or data from being transmitted. A presiding controller may retain idle control by transmitting a continuous sequence of long pulses. However, in this example, the presiding controller has finished its communication. The requesting controllers wait a predetermined period of inactivity, for example, three or more long pulses. They then use weak drive to oppose the polarity of the line signal for some preset time on the order of a long pulse. The presiding controller senses the current and chooses whether to release line control. The controller may ignore the current until it disappears. Data transmission can resume if there is no sensed current. The requesting controllers can wait another period of inactivity to try again. If it is released, the polarity of the line changes with the weak drives. The requesting controllers revert to strong drive and begin a contest to win arbitration. Using a delay based on each controller's priority, they revert to weak drive and attempt to flip the polarity of the line. If a controller is unsuccessful, the controller quits its attempts and waits for the next period of inactivity to try again. Over time, the controllers drop out by disabling their drive outputs until there is one controller remaining. This last controller will be able to flip the polarity of line in weak drive. It assumes strong control as the winner and proceeds with its communications. In some embodiments of this method, the controllers can have a current sense to assist arbitration.

In another embodiment, a method for arbitration uses data instruction packets from the presiding controller to get acknowledgement from the waiting controllers. Periodically, the idle presiding controller can use binary search or another search method to poll waiting controllers with suitable priorities. Once the candidate is found, the presiding controller will address the waiting controller with a data instruction to take over the line. The handoff occurs at the acknowledgement flip of the double long pulse terminator sent by the waiting controller. Priority delay timers and current sensors are not required and standard off-the-shelf controllers may be used.

Variations on these methods for implementing bidirectional communication using the single-wire serial protocol are possible. As non-limiting examples, the protocol mechanisms may include controller data transmission, receiver acknowledgement, receiver data readback, controller arbitration, and controller handoff.

Acknowledge Protocol

Some embodiments of the protocol can include an optional acknowledge function. In these embodiments, acknowledgement can be performed by using the double long pulse terminator in a predetermined fashion. An example implementation is illustrated in FIGS. 3A and 3B. In these examples, data pattern <0110> is sent. After one or more bits 301-304 of data have been clocked into the receiving device, the controller starts the double long pulse terminator. After the controller issues its first long pulse 305, it then sets its output to high impedance or weak drive after a pulse of arbitrary length 307 longer than the predetermined acceptance width. At point 307, the receiving device can flip the logical polarity of the signal for the controller if it is acknowledging the controller. Thus, high signal 305 would be switched to low acknowledgement signal 306 at point 307 if acknowledgement is performed. The controller can check for a state flip with its driver in the high impedance state. If no acknowledgement is performed, the signal remains unchanged as shown by dotted line 308, the controller can finish the protocol with the second long pulse 309 and accept that there was no acknowledgement of the communication. The lack of acknowledgment appears as a longer initial pulse in the termination sequence. In some embodiments, the receiver will attempt to acknowledge for a predetermined interval after a proper data entry. A controller using only strong drive can flip the acknowledgement on the behalf of a receiver using weaker drive. The receiver can be configured to detect whether it was able to flip the signal in either case. This can be used to signal the moment of data latching.

While the protocol does not require a silent receiver to drive the data line, a responding receiver can be configured to drive an intermediate high, an intermediate low, or a high impedance under acknowledgement conditions. The strength of the receiver intermediate drive is weaker than controller strong drive but stronger than controller weak drive.

Readback Protocol

Figure 5:
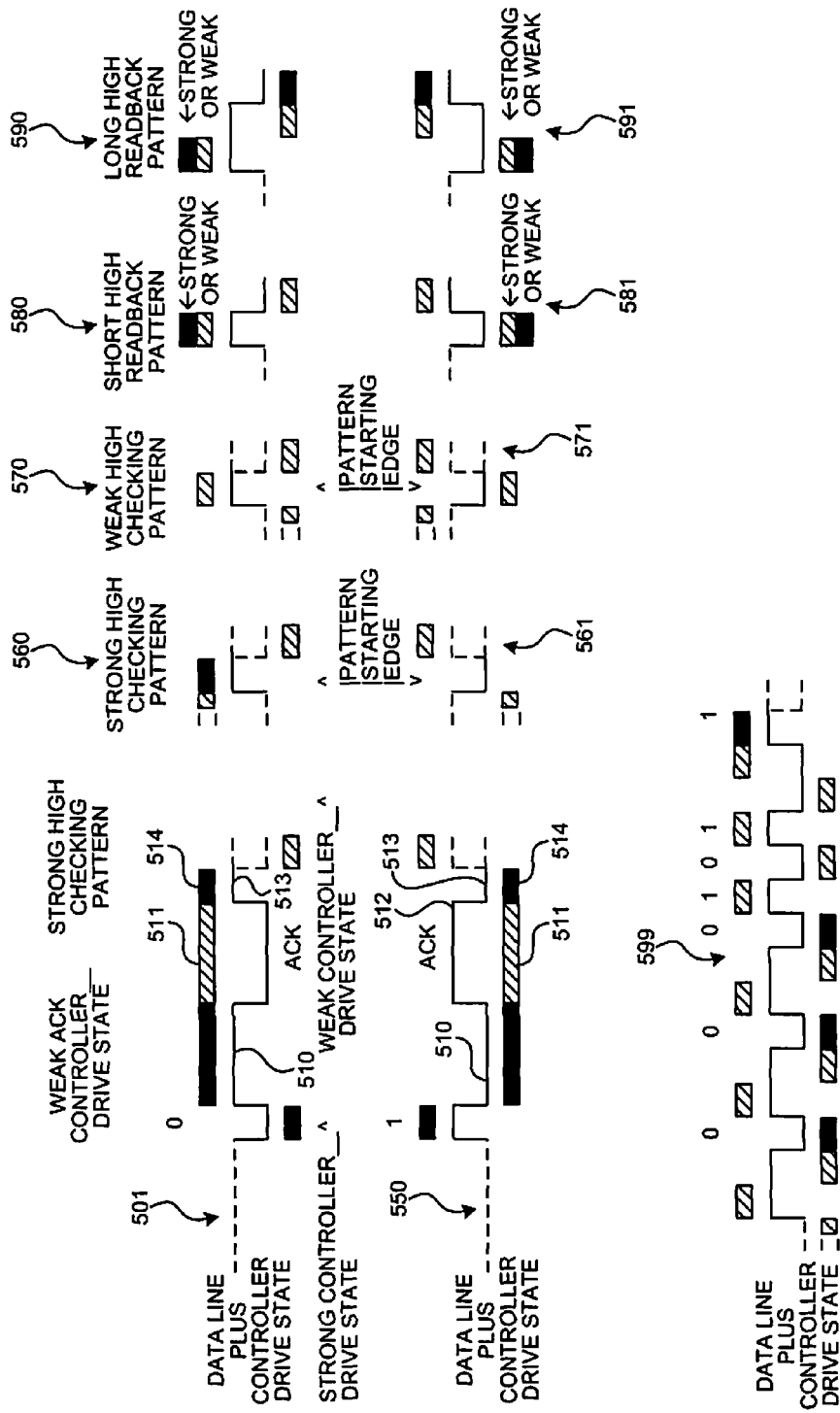
FIG. 5 illustrates example protocol sequences for readback.
Figure 6:
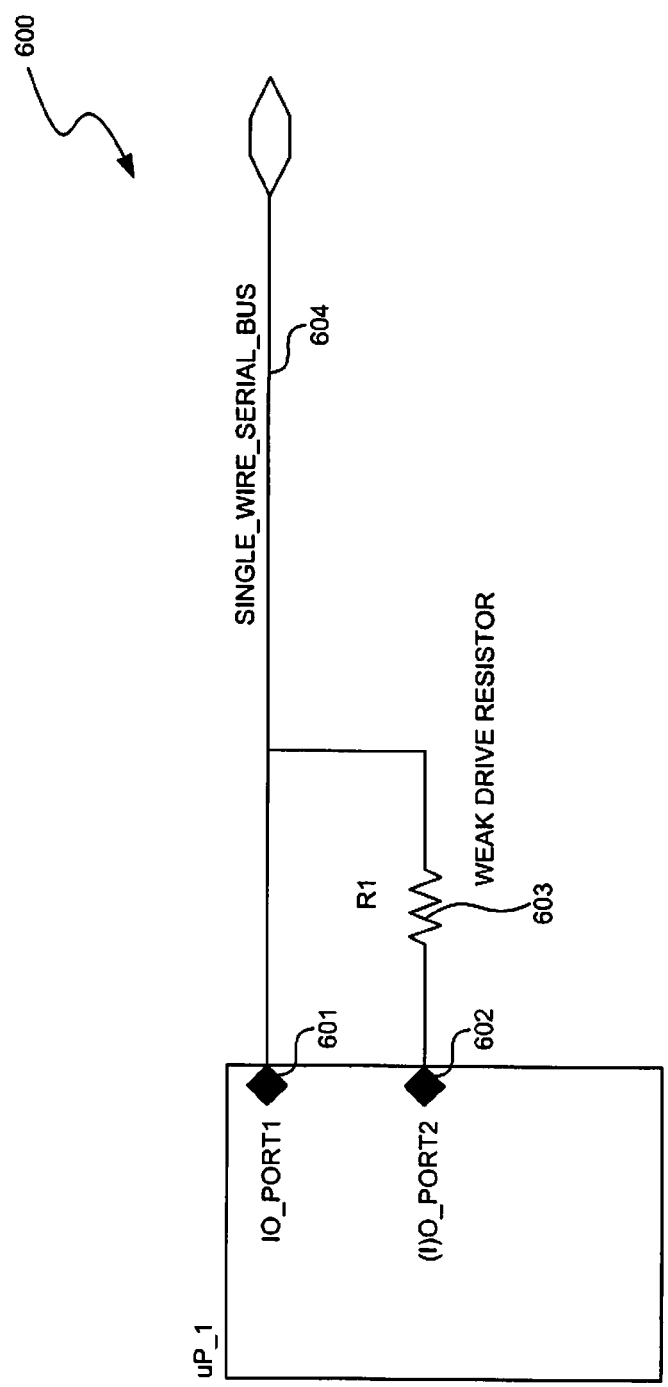
FIG. 6 illustrates an example controller configuration.
Figure 7:
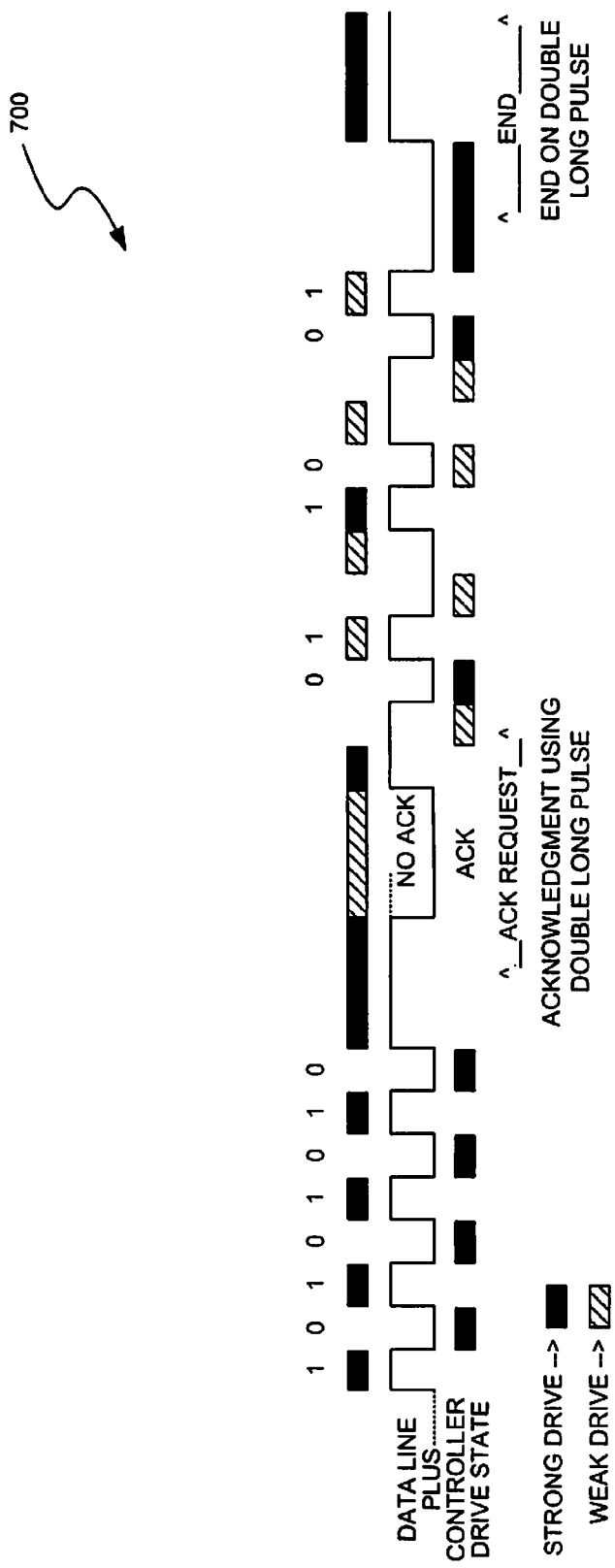
FIG. 7 illustrates an example readback protocol sequence using mixed strong-weak controller drive.

Some embodiments can support acknowledgment and data readback functions. FIGS. 5 and 6 illustrate example protocols for data readback. The acknowledgment function starts the data readback sequence. Before readback, the controller exerts strong drive on the line to transmit the instructions for the receiving device. Two examples are illustrated in FIG. 5. In the first example, drive state 501 has as its last data bit a <0>. In the second example, drive state 550, has as its last data bit a <1>.

The controller terminates the sequence with the first half of a double long pulse termination 510. On the second half, the controller does not flip the polarity of the previous pulse but sustains that pulse with weak drive 511. A responding receiver can then force the polarity flip 512 with its own intermediate drive. This flip acknowledges the controller.

The controller then responds by timing out a full long pulse and then forcing the opposite polarity 513 with strong drive 514. This signals the receiver to send its first data bit, most significant bit first, if that bit is the same polarity as the current line state. The polarity of the short pulse represents the data bit polarity transmitted. If the receiver's data bit is the same polarity as the signal line, the receiver will force the pulse to switch polarity at the point that the controller reverts to weak drive or the controller's weak drive changes polarity. The changes in polarity can be timed to result in a short pulse signaling that a valid data bit is transmitted.

The receiver compares subsequent data bits on following transitions. If the bit polarity does not match the signal line polarity, the receiver will try to hold the line polarity as long as possible while ignoring the controller's weak drive polarity change. When the data polarity matches the line polarity, the receiver can make the pulse short either at the controller's weak drive changes or after a predetermined time shorter than the pulse acceptance width. Because a long pulse is an ignored pulse, the receiver holds the current bit until the correct polarity for a short pulse occurs. This protocol, therefore, can be performed with not more than one long pulse between two short pulses to transmit data.

The controller can continue to use weak drive flipping until a long pulse is encountered. At the end of the long pulse, the controller uses strong drive to force a polarity flip and the continuation of the data readback sequence. The receiver senses line changes and decides whether to use a short or long pulse depending on the current bit polarity match or mismatch. If the receiver senses that the controller is exclusively using strong drive, then the receiver will use timers to interject weaker drive to force the transitions. The receiver timers can be set to be longer than the timing of the controller to allow the controller to time the protocol under the mixed controller drive case. This scenario allows the controller to check the short pulse timing of the receiver. In some embodiments the controller controls the timing exclusively under the assumption of a standard timing model for receivers and controllers. This sequence continues until the controller senses a certain number of short pulses, senses a double long pulse termination sequence, or forces a termination through strong drive. This sequence can be used for data readback for any number of bits. In some embodiments, the readback sequence can differ in either data or data length to distinguish readback data from controller commands for other receivers.

Various different checking and readback patterns can be used. As illustrated in FIG. 5, if the data bit is a <0>, a strong high checking pattern 560, a weak high checking pattern 570, a short high readback pattern 580, and a long high readback pattern 590 can be used. If the data bit is a <1>, a strong low checking pattern 561, a weak low checking pattern 571, a short low readback pattern 580, and a long low readback pattern 591 can be used. An example partial data readback pattern with strong and weak drive states 599 is illustrated in FIG. 5.

To implement the protocol, the controller can drive weak and strong levels and sense the corresponding drive levels from a receiver. As illustrated in FIG. 6, a controller can achieve this by using two input-output pins 601 and 602 or a suitable equivalent. One pin can 601 connect directly to the line 604 and the other 602 through a weak drive resistor 603 to the line 604. As a non-limiting example, the direct drive pin 601 can have an impedance of 1 Kohm and the weak drive resistor 603 can have an impedance of about 25 Kohms. The receiver can have an intermediate drive impedance of 5 Kohms to drive the line when the controller reverts to weak drive.

A controller for performing the protocol described herein can have a current sensor and drive control combined with an input-output pin. In some embodiments, the controller can run only on strong drive except when it relinquishes line control to another controller. The receiver can attempt to shift the line with weaker drive but cannot accomplish this under strong controller drive. The receiver can use an internal timer to pick an appropriate time to flip if the pulse is short. In some embodiments, the receiver timing can be longer than the timing used by the controller for a short pulse. This allows standard controller's timing to use strong and weak drive to allow the receiver to drive the line.

If the pulse is long, in some embodiments, the receiver will not attempt the polarity flip, thereby leaving the controller to flip the polarity after a long pulse. If a receiver is acknowledging incoming data, the receiver will attempt to change the polarity of the first long pulse to the second long pulse. The controller can make the transitions by sensing the resultant current from the receiver's drive efforts. If observation on an oscilloscope is desired, the controller can lengthen the first long pulse in the acknowledgment phase to visually show more clearly that no weaker drive and, therefore, no acknowledgment was sensed on the line.

Figure 8:
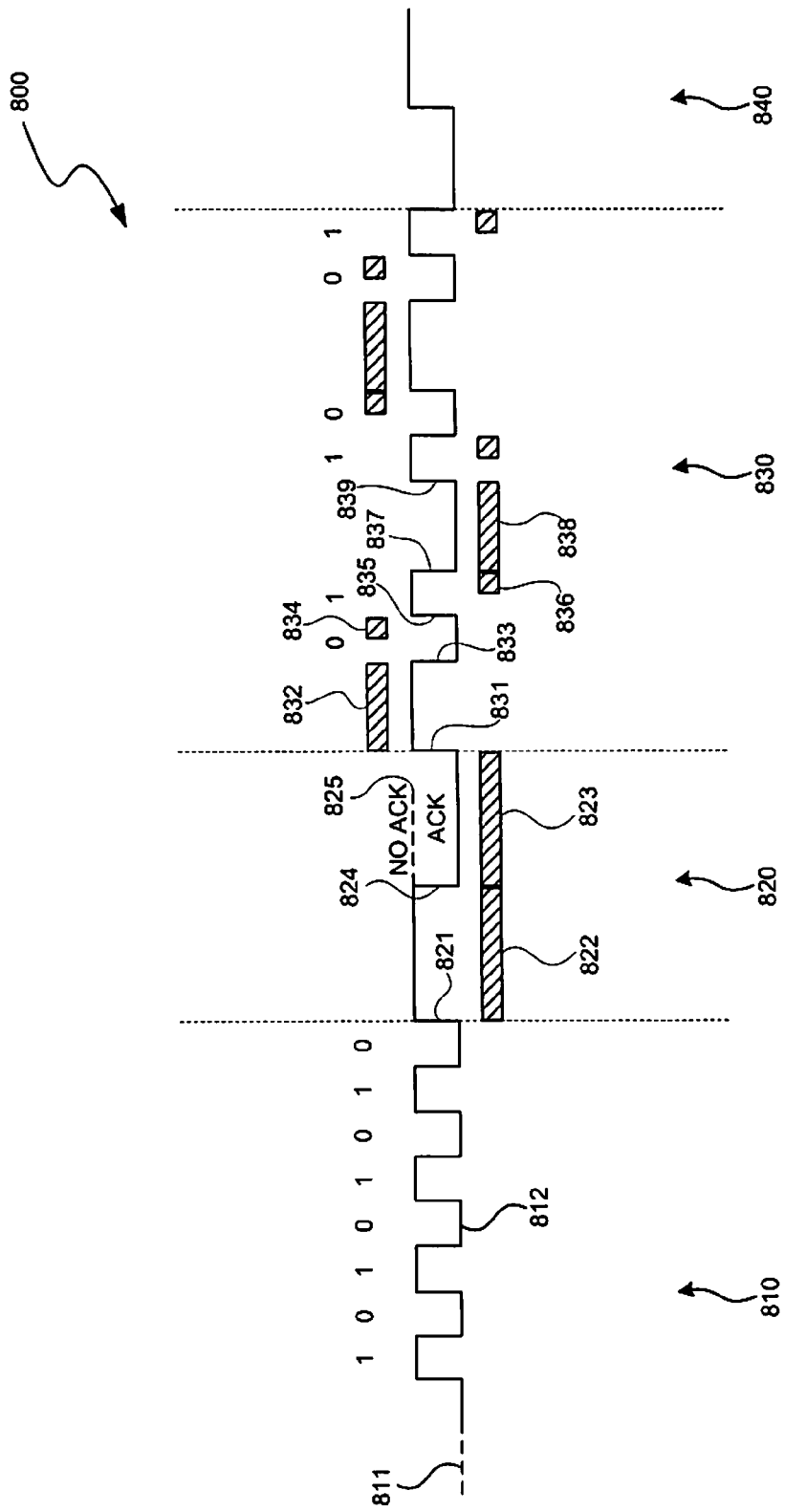
FIG. 8 illustrates an example readback protocol sequence using strong controller drive.

With reference to FIG. 8, an example of readback scheme is illustrated. In this example, data pattern <10101010> is sent and <011001> is read back. FIG. 8 illustrates the use of strong drive by the controller and the corresponding weaker drive by the receiver. The controller makes transitions in response to current from the receiver drive effort. This example does not use any long delay in the first long pulse of the termination sequence from the receiver weaker drive but it may use delay for each short pulse transition. Delay may be used for compatibility with the weak drive flipping case for mixed strong-weak controller drive. There is no delay necessary in the terminator or the long pulse. The first long pulse of the terminator is generated under strong drive. The long pulse has drive in the same polarity therefore there is no sensed current or flip attempt.

In some embodiments, the receiving part can have an interface that combines input-output functionality with a current sensor. Using the current sensor, the part can respond to both weak and strong drive situations to flip the polarity at the correct point. At least two different drive patterns can be used. In a first case, weaker acknowledgment drive applies drive to flip the second long pulse. In data mode, the weaker drive attempts to keep the pulse long if the data readback bit and the line polarity do not match or it attempts to flip the pulse after a short pulse interval if the data readback bit and the line polarity match. The short pulse delay in the receiving part can be longer than the short pulse timing used by the controller. In some embodiments, the controller always uses strong drive when controlling the line. A current sensor can be used to determine the presence of a response.

In a second case, strong-weak drive lets the controller time the edge transitions with its transition to weak drive. In the strong-only drive case, the controller can wait the longer time to sense the current from the part's polarity flip attempt.

In some embodiments, logic levels on the single wire port can be matched so that supply mismatches do not cause one part to drive another part outside its supply range. In some embodiments logic swing ranges can be reduced to 2V so that 0.8 Vil and 1.2 Vih-1.4 Vih are likely thresholds to use up to 5V supply. The thresholds can be configured to account for weaker drive induced changes on a stronger drive's voltage levels by setting appropriate threshold guard bands.

In some embodiments, a debounce circuit (not shown) can be used to prevent glitches from appearing as data. Filtering for 100 ns or more can be used to suppress unwanted voltage and current glitches.

CIRCUIT EMBODIMENTS

In some embodiments, relatively simple circuitry can be used for measuring the width of a pulse and determining the acceptance of the pulse. One example embodiment of such a circuit for a serial port is illustrated in FIG. 9.

Figure 9:
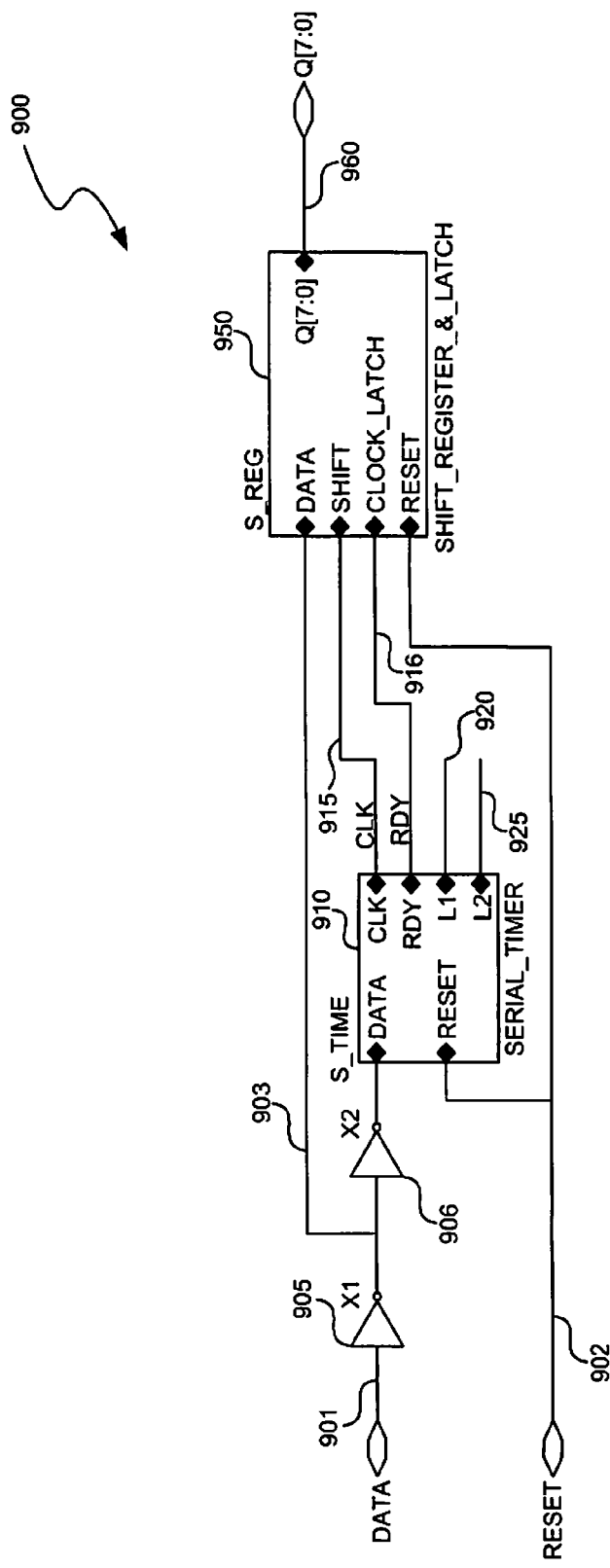
FIG. 9 illustrates an example circuit for a single-wire serial port.

As illustrated in FIG. 9, serial timer 910 checks for a short pulse and, if a short pulse is detected, produces a narrow clock pulse on line 915 to the shift input of the shift register 950. Inverter 905 inverts the polarity of the data on data line 901 and outputs the inverted data on line 903 for input to shift register and latch 950. In some embodiments, an inverted data signal can be used as input at shift register 950 because the logic level that should be stored would have been received before the transition ending the pulse. For example, a narrow high pulse will finish with a transition to low. As a result, the low signal is available when CLK signal 915 pulses high. Therefore, inverter 905 can be used to restore the data polarity. In alternative embodiments, inverter 905 can be omitted if the polarity of the data is not required or if it is otherwise stored, known, or can be determined.

When the RDY signal 916 triggers, the standing data in shift register 950 clocks into the latches on the rising edge of RDY signal 916. In some embodiments, serial timer 910 can be symmetric in behavior for low and high pulses. In those embodiments, inverter 906 may be optional. It is understood that the removal of inverter 906 will flip the polarity orientation of output signals L1 920 and L2 925, but not otherwise affect operation of the circuit.

While shift register and latch 950 is illustrated as one integrated functional unit, these functions could be distributed across multiple functional units. Shift register and latch 950 can drive output bus 960. In the example illustrated, bus 960 carries 8 bits. In other embodiments, the shift register and bus can be configured to carrier more or fewer bits. In the illustrated example, a single RESET signal 902 can be used to perform a reset on both serial timer 910 and shift register and latch 960.

Figure 10:
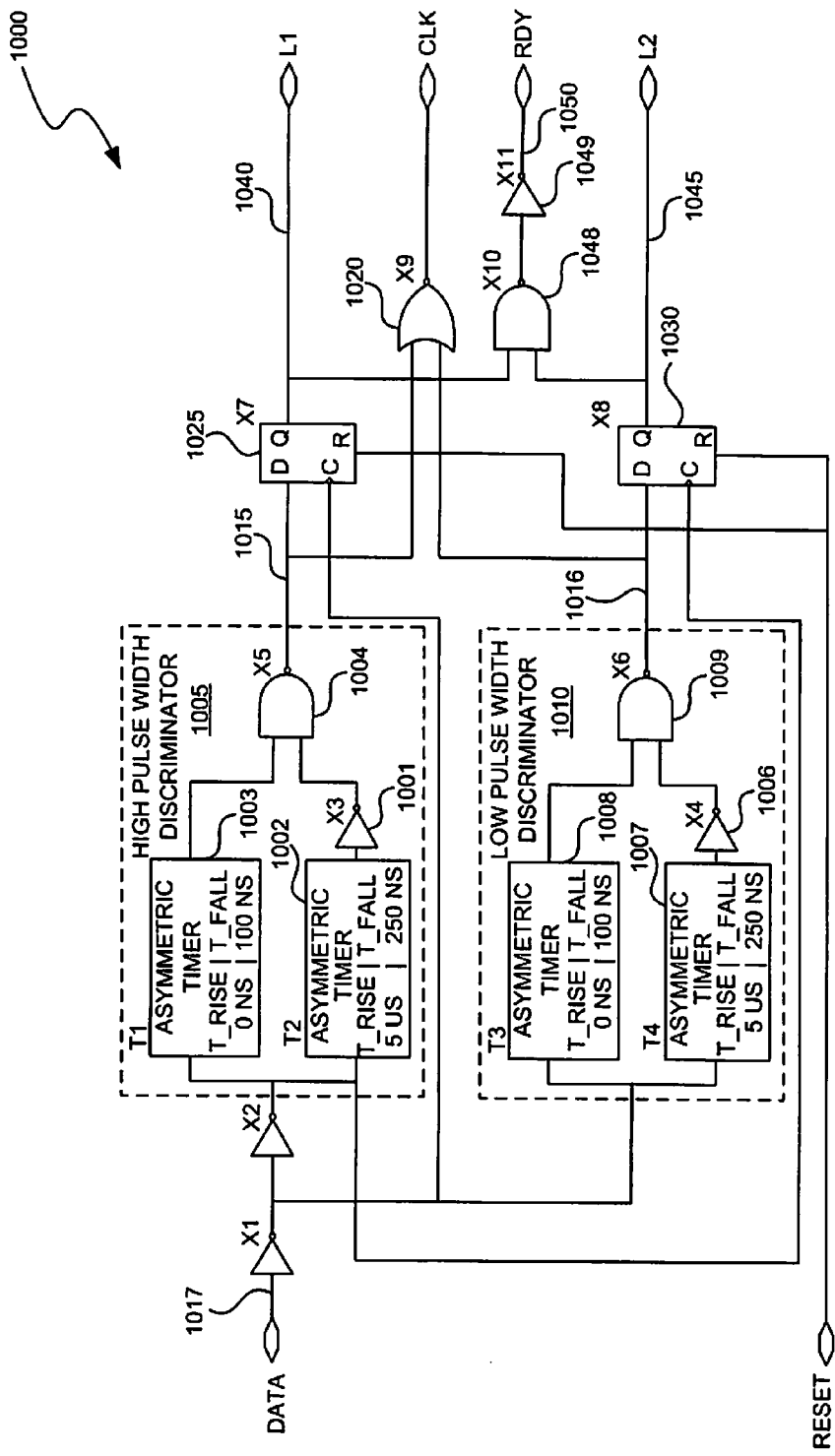
FIG. 10 illustrates an example serial timer for discriminating between pulse widths.

One example implementation of serial timer 910 is illustrated in FIG. 10. In this example circuit, use two pulse discriminators are used, one high pulse width discriminator 1005 and one low pulse width discriminator 1010. Pulse width discriminators can include one or more devices for implementing a delay. Pulse width discriminator 1005 can include asymmetric timer 1003 and asymmetric timer 1002. As a non-limiting example, asymmetric timer 1003 can be configured to have a rise time of nearly 0 ns and a fall time of 100 ns and asymmetric timer 1002 can be configured to have a rise time of 5 us and a fall time of 250 ns. The output of asymmetric timer 1002 can be further coupled to inverter 1001. Pulse width discriminator 1010 can include asymmetric timers 1008 and 1007 and inverter 1006. The delay timings for asymmetric timers 1008 and 1007 can be selected to be the same or different from those of asymmetric timers 1003 and 1002.

The pulse width discriminators 1005 and 1010 will output a high signal on lines 1015 and 1016, respectively, if the input pulse on data line 1017, whether high or low, is longer than the predetermined width. Any sustained high pulse from NAND gate 1004 or NAND gate 1009 prevents NOR gate 1020 from making high pulses necessary for clocking the registers. Some embodiments can further include D flip-flops 1025 and 1030 for storing long pulses. If there are two long pulses in a row, signals L1 1040 and L2 1045 will be high and the RDY output 1050 from inverter 1049 will be high signaling the end of the protocol, as discussed above.

In some embodiments, some or all of flip-flops 1025 and 1030, and NAND gates 1048 and inverter 1049 need not be included in the circuit if there is no need to latch the data in at shift register 950. Omission of these components can save space on applications with a lone receiver.

Figure 11:
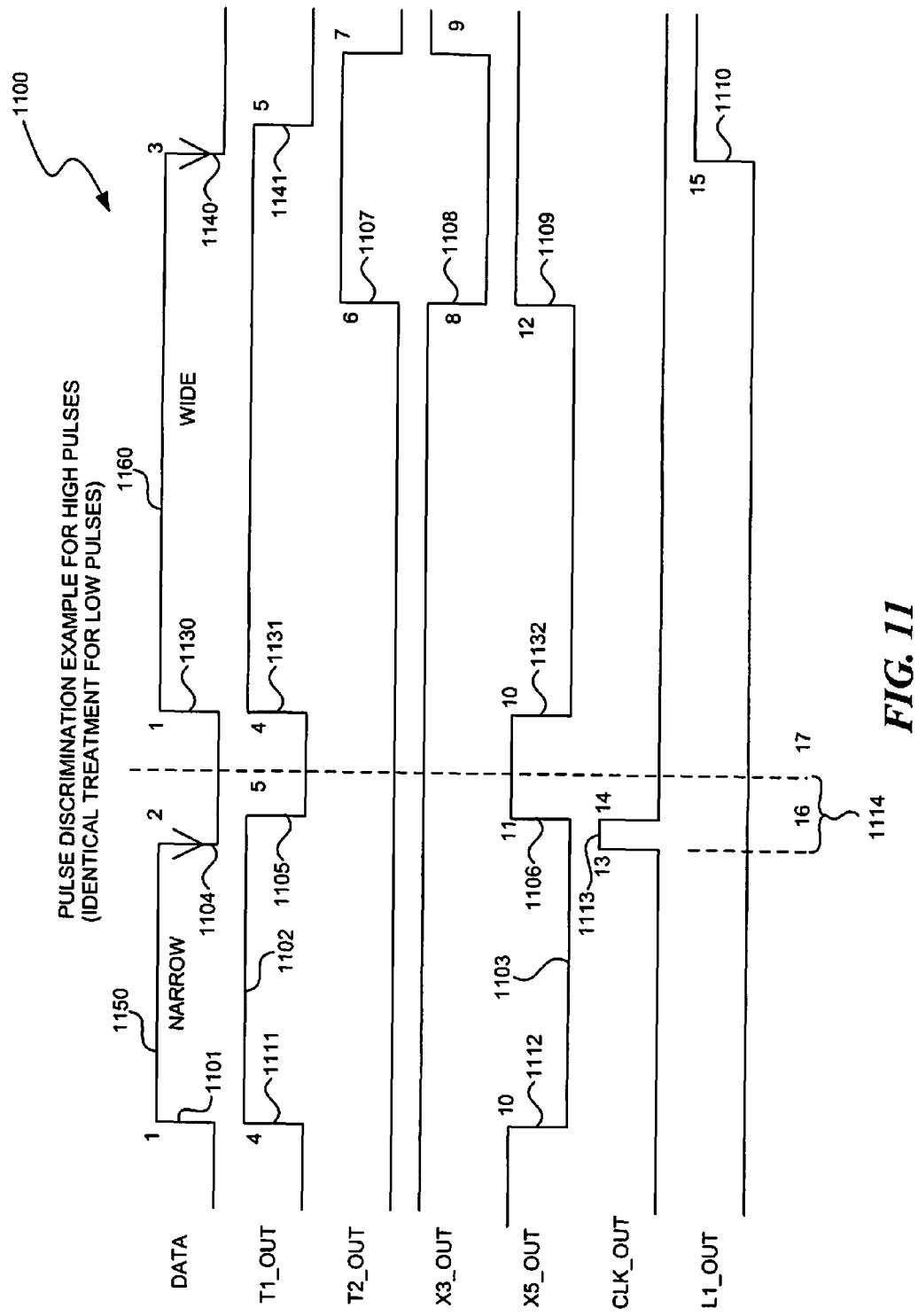
FIG. 11 illustrates example input and output sequences.

An example timing diagram for high pulse width discrimination is illustrated in FIG. 11. Timing for low pulse width discrimination is similar. As illustrated, the use of asymmetric timers with separate rising and falling edge timing generates clocking and ready pulses. FIG. 11 illustrates two high pulses, a first one 1150 that is narrow and a second one 1160 that is wide. At the transition 1101, a narrow high pulse is beginning. This pulse causes the output of asymmetric timer 1003 to go high 1102 at transition 1111 and the output of NAND gate 1004 to go low 1103 at transition 1112. Due to the narrow width of the pulse 1150, asymmetric timer 1002 does not have time to change to a high. As a result, the output of inverter 1001 remains high. When the narrow pulse 1150 ends at transition 1104, the asymmetric timer 1003 causes its output to fall 100 ns later at transition 1105. This will cause the output of NAND gate 1004 to stay low 1103 an extra 100 ns before going high at transition 1106.

Because the corresponding low pulse width discriminator output at NAND gate 1009 will be going low at the beginning of the low pulse in the same manner as the output of NAND gate 1004 did at the beginning of the high pulse, the two lows will create a high pulse 1113 on the clock output of 100 ns.

The low on NAND gate 1004 at the termination of the narrow pulse 1150 at transition 1104 is clocked into flip-flop 1025 causing output L1 1040 to register a low for narrow pulse 1114. The width of the low pulse 1114 does not affect the next rising transition outputs 1130, 1131, and 1132 because the minimum width for a pulse is wider than the falling edge timing of either timer 1003 or 1002.

In the case of wide pulse 1160 bounded by transitions 1130 and 1140, the action of asymmetric timer 1003 can be the same as for the narrow pulse. Asymmetric timer 1002, however, has enough time to reach its 5 us timing. Timer 1002 changes high at transition 1107, causes the output of inverter 1001 to go low at transition 1108 and the output of NAND gate 1004 to go high at transition 1109. Because the turnoff time for timer 1002 is 250 ns and the turnoff time for timer 1003 is 100 ns, the falling edge of pulse 1160 at transition 1140 will not get through to the clock output. Timer 1002 effectively blanks the pulse caused by the transitions at 1140 and 1141. The high on the output of NAND gate 1004 causes the falling edge of the wide pulse 1160 at transition 1140 to clock in a high into flip-flop 1025. Output L1 1040 is then transitioned to high 1110 to indicate a long pulse. Symmetrically, if the same sequence is presented to flip-flop 1030 and output L2 1045, a double long pulse termination will be signaled at RDY output 1050 to end the protocol.

Figure 12:
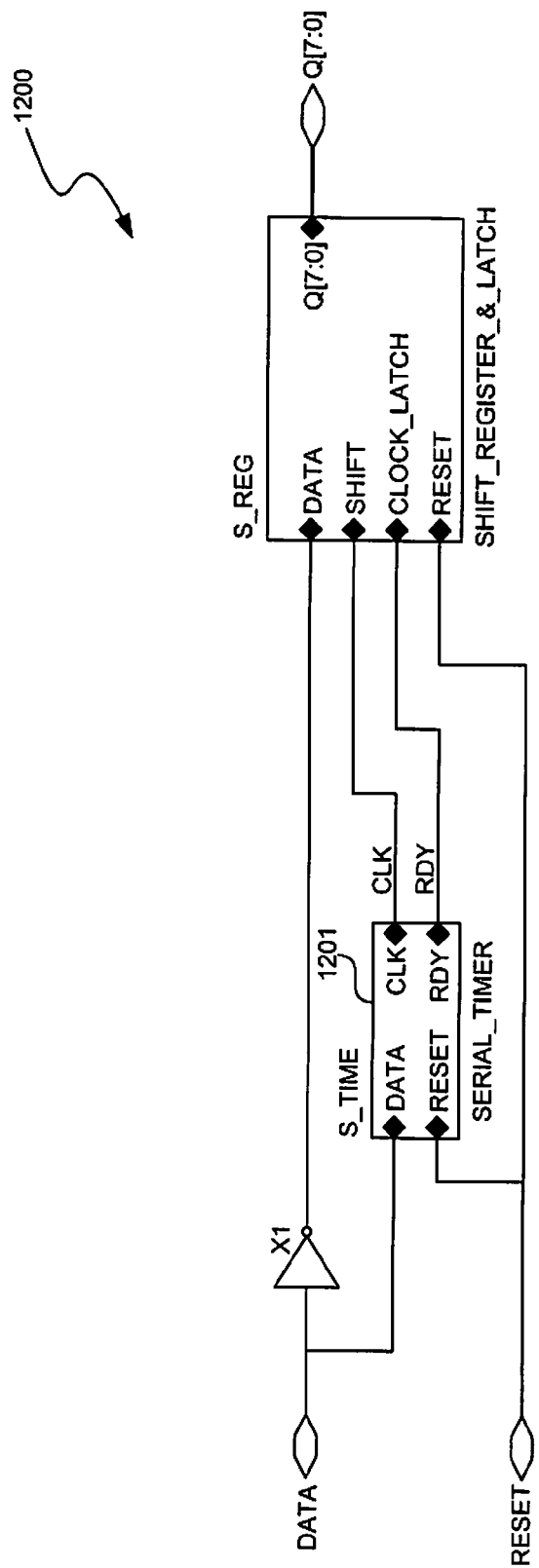
FIG. 12 illustrates example circuit for a serial port.
Figure 13:
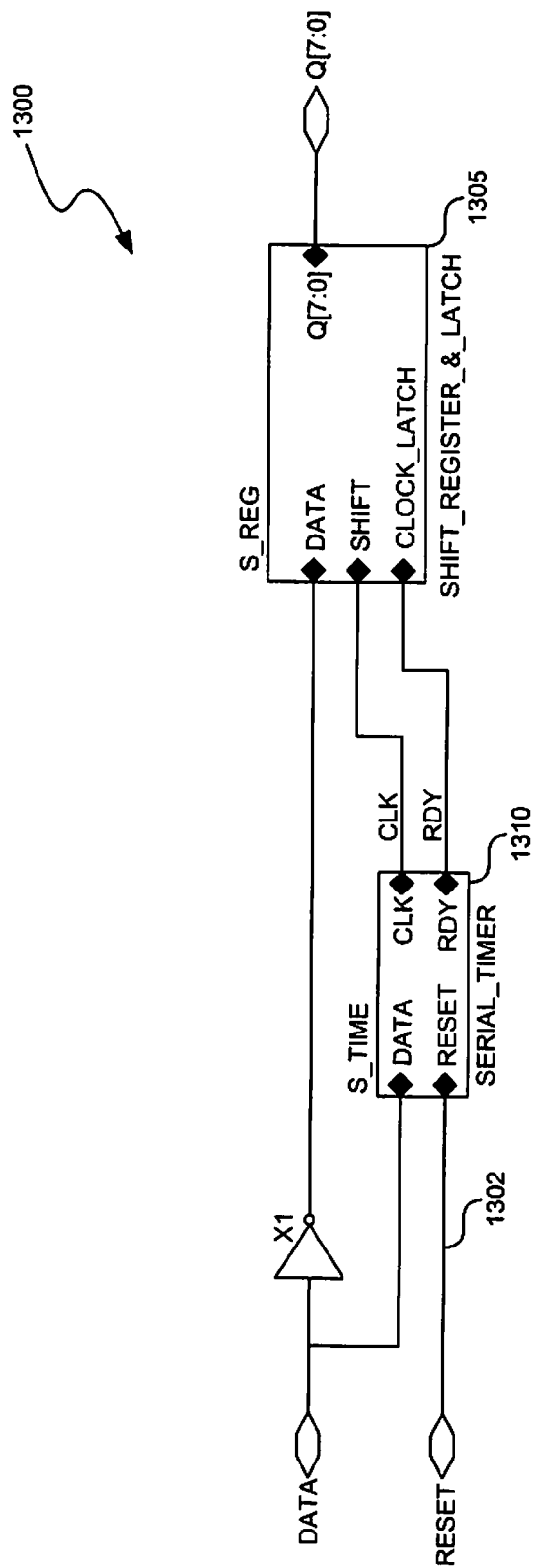
FIG. 13 illustrates example circuit for a serial port.

An alternative embodiment is illustrated in FIG. 12. In this example embodiment, inverter 905 of FIG. 9 is not used. Additionally, serial timer 1201 does not include outputs L1 or L2, illustrated as 920 and 925 in FIG. 9, respectively. As illustrated in FIG. 13, in some embodiments, the shift register and latch 1305 can be implemented without a reset input. Thus, reset signal line 1302 can be input to serial timer 1310 directly.

Figure 14:
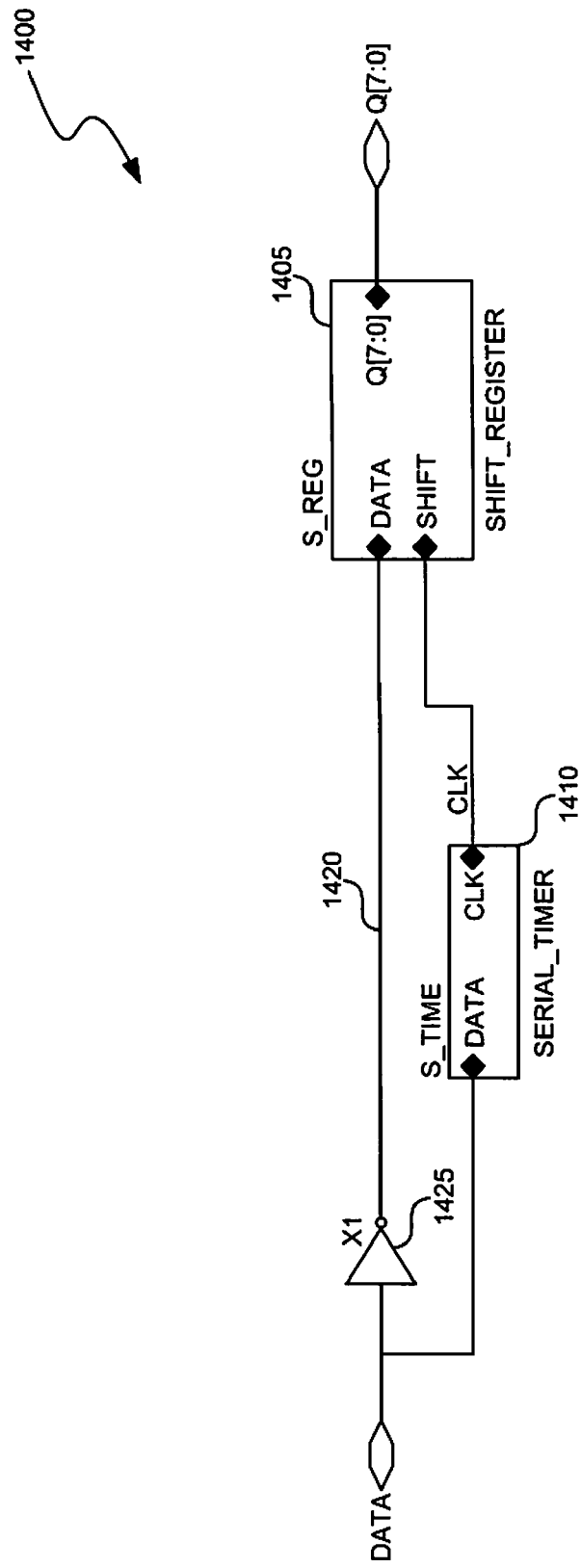
FIG. 14 illustrates example circuit for a serial port.

In some embodiments, the data is not latched. One example of such an embodiment is illustrated in FIG. 14. As illustrated in FIG. 14, shift register 1405 can be configured without the use of reset or ready signals. In such embodiments, serial timer 1410 can be configured without a READY output. As discussed above, a decision whether to clock the register can be made based on pulse width. In the embodiment illustrated in FIG. 14, the data line 1420 coupled to shift register 1405 has inverter 1425 but no decision circuitry.

Figure 15:
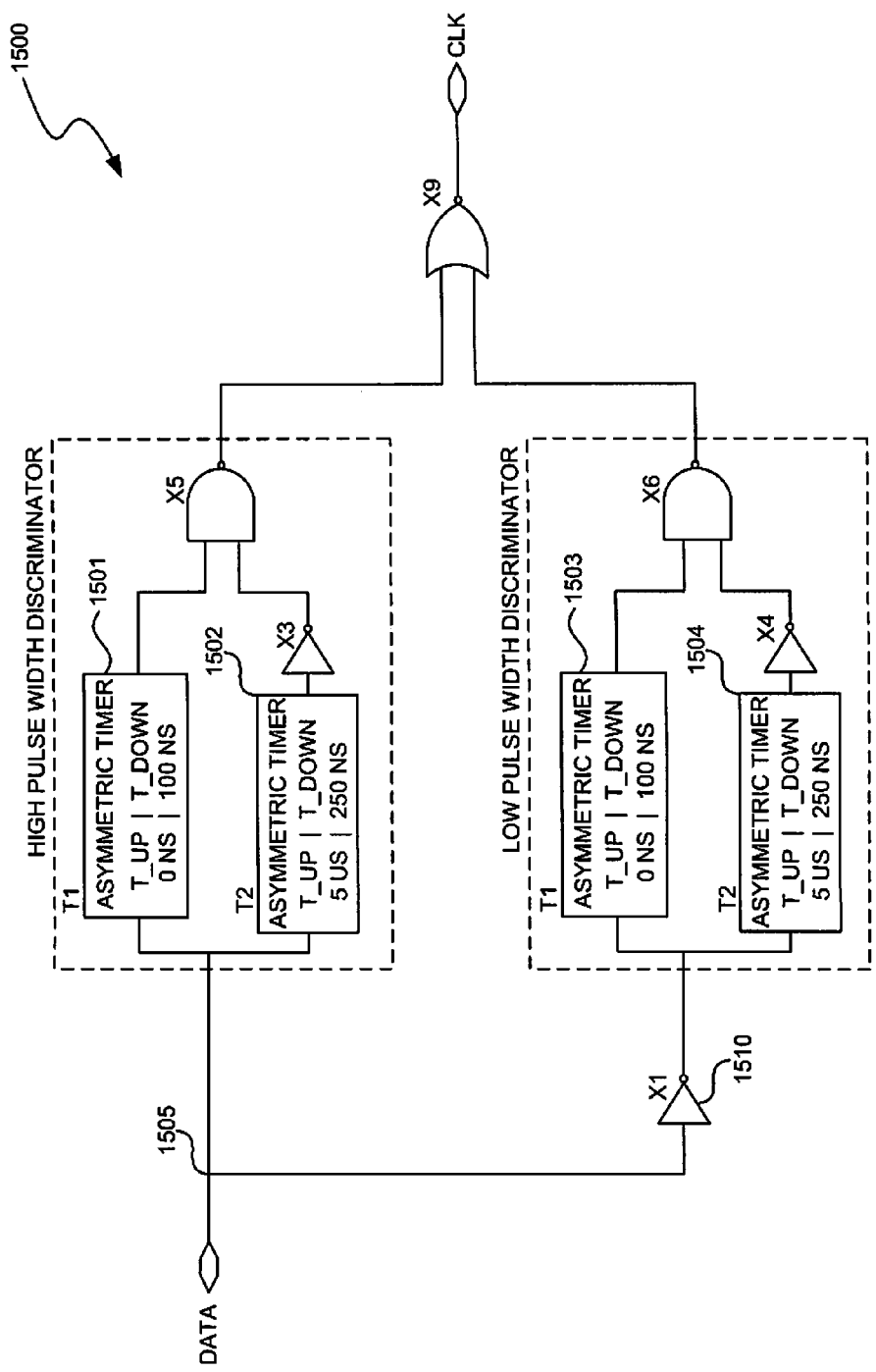
FIG. 15 illustrates an example serial timer for discriminating between pulse widths.

A serial timer 1500 for use in the embodiment illustrated in FIG. 14 is illustrated in FIG. 15. In some embodiments, timers 1501-1504 are asymmetric delay timers. The delay times for each of timers 1501-1504 (and any other timer disclosed herein) can be programmed individually or configured to have a delay of any value which enables pulse width discrimination according to protocol requirements. In some embodiments, timer 1500 can be implemented with only one inverter 1510 on data line 1505. Timer 1500 can also be implemented without the use of flip-flops and other gates and logic structures.

CONCLUSION

A new protocol for a serial communication system is disclosed in which short pulses represent data and long pulses represent data separators. The polarity of short pulses indicates their values.

In some embodiments, a single controller or multiple controllers can be used interchangeably with receivers on a single wire (line) that connects them together. A receiver can include one or more silent receivers, data acknowledging receivers, and/or data readback receivers. Controllers and receivers can output either strong output drive, weak output drive, intermediate output drive, or no output drive (high impedance output drive) depending on their controlling status of the line.

In embodiments in which a single controller is used, strong output drive may be used exclusively if receivers are silent. If multiple controllers or receivers are used, whether for data acknowledgement, for data readback, or for control arbitration, the controller or controllers can support any combination of output drive type. Normally, non-interchangeable receivers use no drive. However, for acknowledgment and readback, they also use intermediate output drive.

In some embodiments, controllers can use a current or voltage sensor during strong drive to allow indirectly acknowledgement and readback from receivers without resorting to using different output drive strengths. Signal drive strength can be selected to overcome loading and noise problems in the surrounding environment where the line is being used. Furthermore, timing specification for long and short pulses can also be selected to overcome loading, noise, and transmission characteristics of the line.

In some embodiments, a single silent receiver neither latches in data nor use a terminator. In addition, silent receivers do not drive the line. Multiple silent addressable receivers can latch in data in response to a double long pulse terminator when it is properly addressed. On the other hand, responding receivers can use a weaker high drive and a weaker low drive as well as no drive under readback and acknowledgement conditions.

The protocol described herein can efficiently be performed with limited circuitry. Controllers and receivers capable of communicating using this protocol can be implemented using the circuitry described above. Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Embodiments of the present invention may be applied to many different types of communications systems. Moreover, features of one embodiment may be incorporated into other embodiments, even where those features are not described together in a single embodiment within the present document.

Many specific details of certain embodiments of the invention are set forth in the description and in FIGS. 1-15 to provide a thorough understanding of these embodiments. A person skilled in the art, however, will understand that the invention may be practiced without several of these details or additional details can be added to the invention. Well-known structures and functions have not been shown or described in detail to avoid unnecessarily obscuring the description of the embodiments of the invention. As used herein, one or more components "coupled" to each other can be coupled directly (i.e., no other components are between the coupled components) or indirectly (i.e., one or more other components can be placed between the coupled components).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined or altered to provide further embodiments.

These and other changes can be made to the invention in light of the above Detailed Description. While the above description describes certain embodiments of the invention, and describes the best mode contemplated, no matter how detailed the above appears in text, the invention can be practiced in many ways. Details of the system may vary considerably in its implementation details, while still being encompassed by the invention disclosed herein.

The terminology used in the Detailed Description is intended to be interpreted in its broadest reasonable manner, even though it is being used in conjunction with a detailed description of certain specific embodiments of the invention. Certain terms may even be emphasized; however, any terminology intended to be interpreted in any restricted manner will be overtly and specifically defined as such in this Detailed Description section. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

I claim:

1. A method used in a single wire serial communication system of providing serial communication for a data stream, comprising:
defining a predetermined short pulse as data and a predetermined long pulse as a data separator using a controller having an input/output pin; and
transmitting said predetermined short pulse as data and said predetermined long pulse as a data separator to a receiver via the input/output pin of said controller, further comprising:
when communicating successive data pulses of the same polarity, providing only one of said data separator between said successive data pulses; and
when communicating successive data pulses of alternating polarity, providing no data separator between said successive data pulses of alternating polarity.

2. The method of claim 1 further comprising transmitting a double long pulse terminator that further comprises two successive long pulses as an optional protocol terminator.

3. A method used in a single wire serial communication system of providing serial communication for a data stream, comprising:
defining a predetermined short pulse as data and a predetermined long pulse as a data separator using a controller having an input/output pin; and
transmitting said predetermined short pulse as data and said predetermined long pulse as a data separator to a receiver via the input/output pin of said controller, wherein said predetermined short pulse comprises a minimum width and a maximum width that define a pulse acceptance width; and said predetermined long pulse is longer than a minimum width and optionally is shorter than a maximum width if an interval of inactivity is used.

4. A method used in a single wire serial communication system of providing serial communication for a data stream, comprising:
defining a predetermined short pulse as data and a predetermined long pulse as a data separator using a controller having an input/output pin; and
transmitting said predetermined short pulse as data and said predetermined long pulse as a data separator to a receiver via the input/output pin of said controller, wherein said serial communication comprises the selection between a combination of both strong and weak controller drive and a strong controller drive only.

5. A method used in a single wire serial communication system of providing serial communication for a data stream, comprising:
defining a predetermined short pulse as data and a predetermined long pulse as a data separator using a controller having an input/output pin; and
transmitting said predetermined short pulse as data and said predetermined long pulse as a data separator to a receiver via the input/output pin of said controller, wherein said receiver directly drives the communication line when said controller uses a strong drive and a weak drive, or indirectly drives the communication line with the assistance of another controller that uses said strong drive and a current or voltage sensor, wherein said driving of the communication line by said receiver comprises acknowledging and responding.

6. A method used in a single wire serial communication system of providing serial communication for a data stream, comprising:
defining a predetermined short pulse as data and a predetermined long pulse as a data separator using a controller having an input/output pin;
transmitting said predetermined short pulse as data and said predetermined long pulse as a data separator to a receiver via the input/output pin of said controller, and
transmitting a double long pulse terminator that comprises two successive long pulses as an optional protocol terminator, and
wherein said serial communication further comprises:
acknowledging the end of a data packet communication by directly or indirectly flipping the polarity of a second long pulse after a controller has transmitted a first long pulse of said double long pulse terminator; and
forcing said controller to change polarity for said second long pulse after said receiver has failed to acknowledge within a waiting interval.

7. The method of claim 6 further comprising:
using a presiding controller to send data to a chosen receiver among a plurality of receivers and controllers;
sending the first pulse in a double long pulse terminator using said presiding controller so that said chosen receiver can change polarity to the second long pulse; and
sending an initial polarity change using said presiding controller so that said chosen receiver may begin sending readback data in the same protocol until said chosen receiver sends a double long pulse terminator.

8. The method of claim 7 further comprising:
sending readback data by either a direct drive from said chosen receiver or indirect drive from said chosen receiver that is assisted by said presiding controller.

9. The method of claim 8 further comprising:
continuing data readback until a double long pulse terminator either interrupts or terminates the protocol by said presiding controller after getting enough but not necessarily all the data, or by said chosen receiver exhausting said readback data and signaling the end of said readback data by causing said double long pulse terminator to appear.

10. The method of claim 9 wherein a receiver timer is used in combination with said strong and weak drive to prevent premature changes in said short pulse and said long pulse.

11. The method of claim 10 wherein said presiding controller uses its own timing to respond to the effort of said chosen receiver whereby forming a short pulse during said readback.

12. The method of claim 10 wherein said presiding controller acts at the end of a long pulse to continue the protocol.

13. A method of arbitrating between multiple controllers in a serial communication, comprising:
interchanging the role of a controller and a receiver;
defining said controller as idle if its communication line has no transition for a predetermined interval of inactivity; and
addressing listening controllers using a presiding controller so as to poll and select a next controller to preside through an addressed instruction packet.

14. The method of claim 13 wherein the handoff between any pair of controllers occurs at an acknowledgement polarity change for a second pulse in a double long pulse termination in response to a takeover instruction from a relinquishing controller.

15. The method of claim 13 wherein:
said controller includes an assigned address proportional to an arbitration time delay that is longer than a long pulse and shorter than a predetermined interval of inactivity;
the change in the line polarity after line release begins a contest for control of the line and contesting controllers use strong drive to hold the new polarity;
contesting controllers compete for control of the line by using weak drive to attempt a line polarity change after a individually set time interval that is longer for higher priority, said contesting controller that possesses the longest time interval win the contest for the line; and
said contesting controller, upon failing to change the polarity of the line through said weak drive, relinquishes the line by turning off its output drive and waiting for the next interval of inactivity.

16. The method of claim 13 wherein a presiding controller declines to release control by maintaining the line polarity, ignoring an arbitration attempt, and waiting for a sensed current from said contesting controller to disappear; or transmitting a continuous sequence of long pulses to thwart an arbitration attempt.

17. A single wire serial communication system comprising a controller that operates as a transmitter when said controller includes a strong drive only, wherein said controller operates as said transmitter and said receiver when said controller includes said strong drive and a weak drive, wherein said receiver includes an intermediate drive that is weaker than said strong drive and stronger than said weak drive.

18. The single wire serial communication system of claim 17 wherein said controller operates as said transmitter and a receiver when said controller includes said strong drive and a current or voltage sensor.

19. The single wire serial communication of claim 17 wherein said receiver is either an addressed or a non addressed receiver,
when said receiver is said non-addressed receiver, said receiver is a silent receiver; and
when said receiver is said addressed receiver, said receiver is either said silent receiver or an acknowledging receiver, wherein said acknowledging receiver further includes either a non-readback receiver or a readback receiver.

20. A single wire serial communication system, comprising:
a timer operable to generate a clock signal for data which is a predetermined short pulse and to generate no clock signal for a data separator which is a predetermined long pulse; and
a shift register coupled to said timer for storing data based on said generated clock signals, wherein said timer further comprises:
a first flip-flop for storing the presence of a high long pulse;
a second flip-flop for storing the presence of a low long pulse; and
combinatorial logic for determining the presence of a double long pulse terminator from said first flip-flop and said second flip-flop.

21. The single wire serial communication system of claim 20 wherein said timer further comprises:
a high pulse width discriminator;
a low pulse width discriminator; and
combinational logic coupled to the high pulse width discriminator and the low pulse width discriminator for determining whether a received pulse is said data or said data separator.

* * * * *